No. 811,284.  
PATENTED JAN. 30, 1906.
T. F. GAYNOR.  
ELECTRIC RACE TRACK.  
APPLICATION FILED MAR. 14, 1905.
5 SHEETS—SHEET 1.
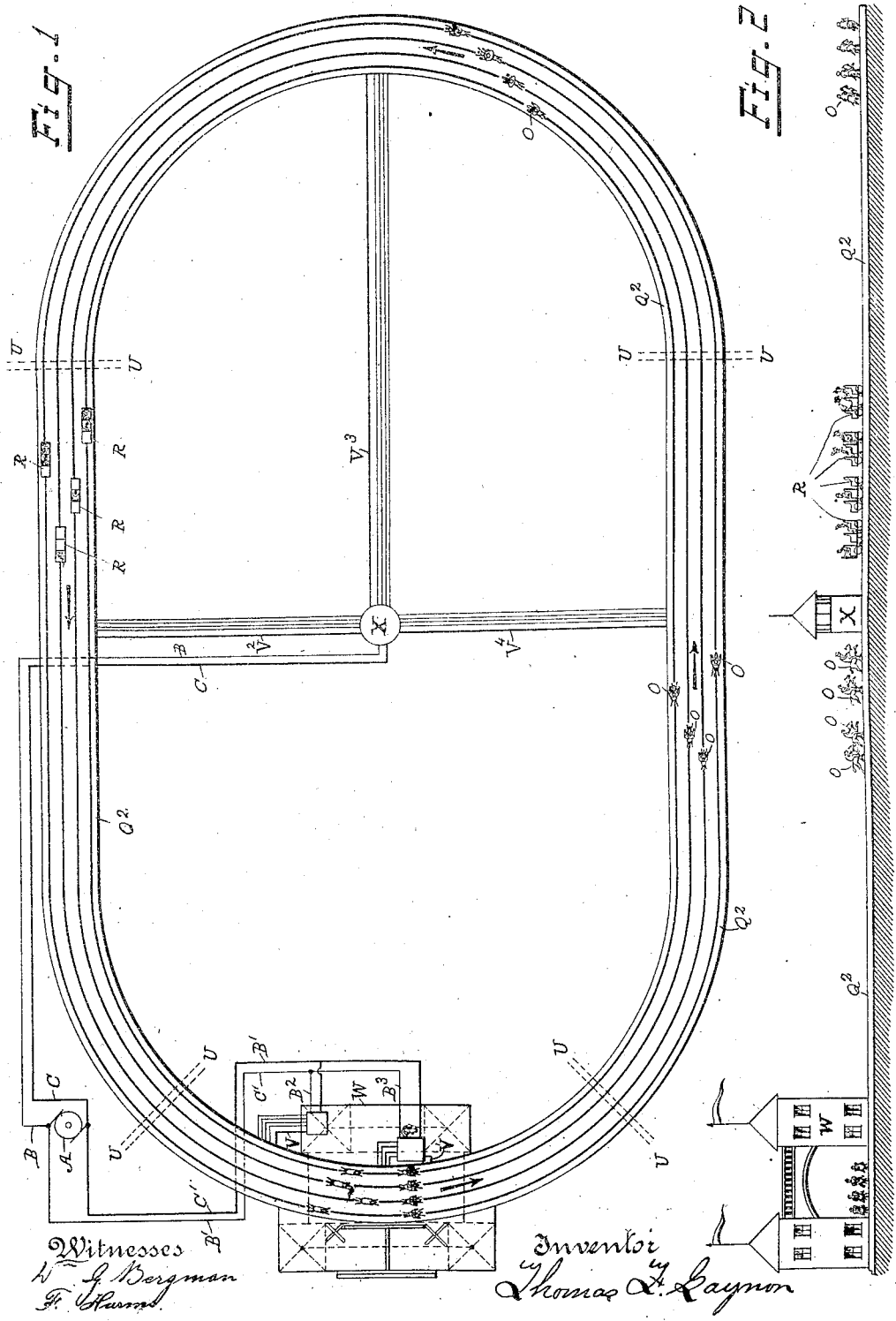

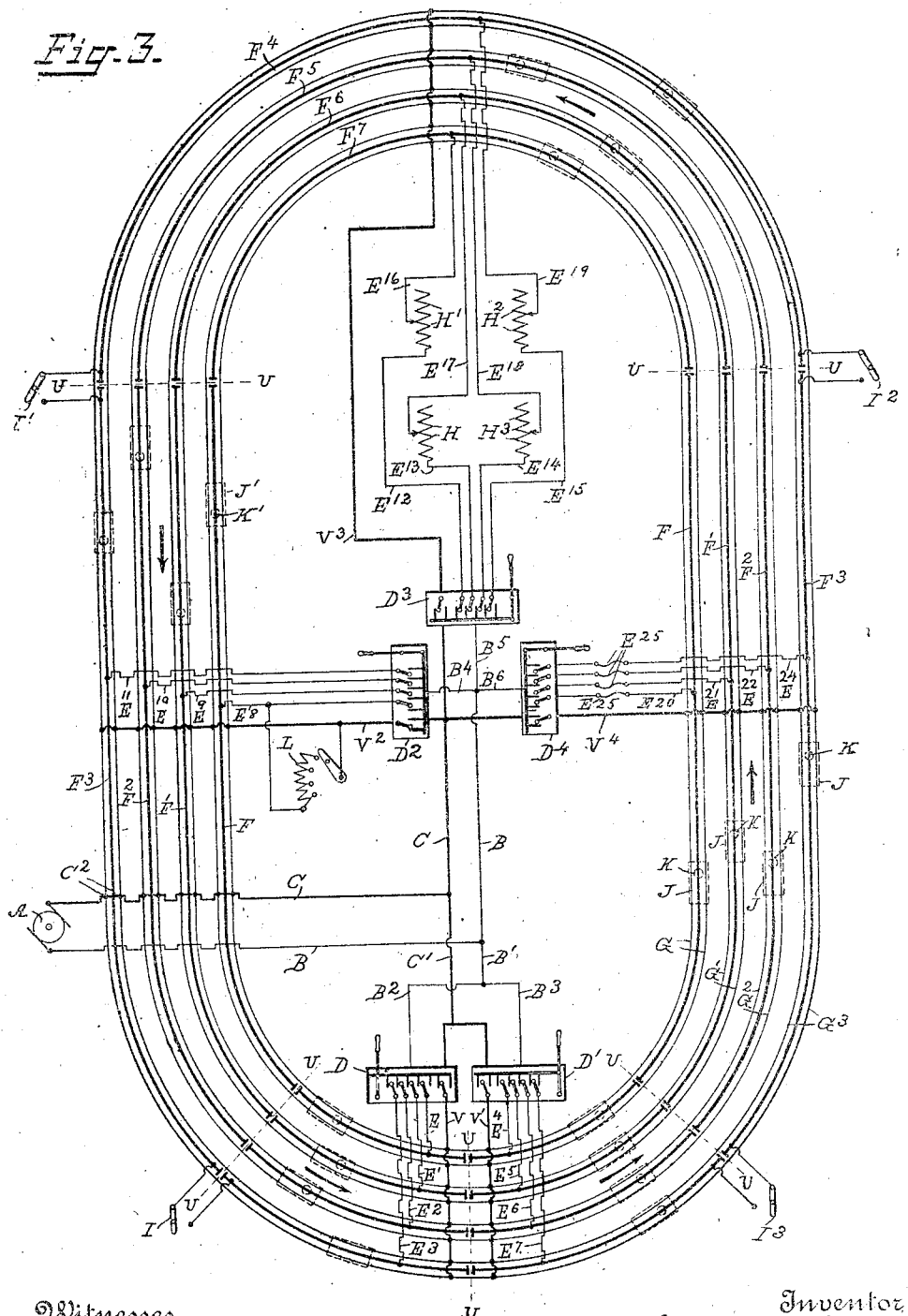

No. 811,284. PATENTED JAN. 30, 1906.
T. F. GAYNOR.
ELECTRIC RACE TRACK.
APPLICATION FILED MAR. 14, 1905.
5 SHEETS—SHEET 3.
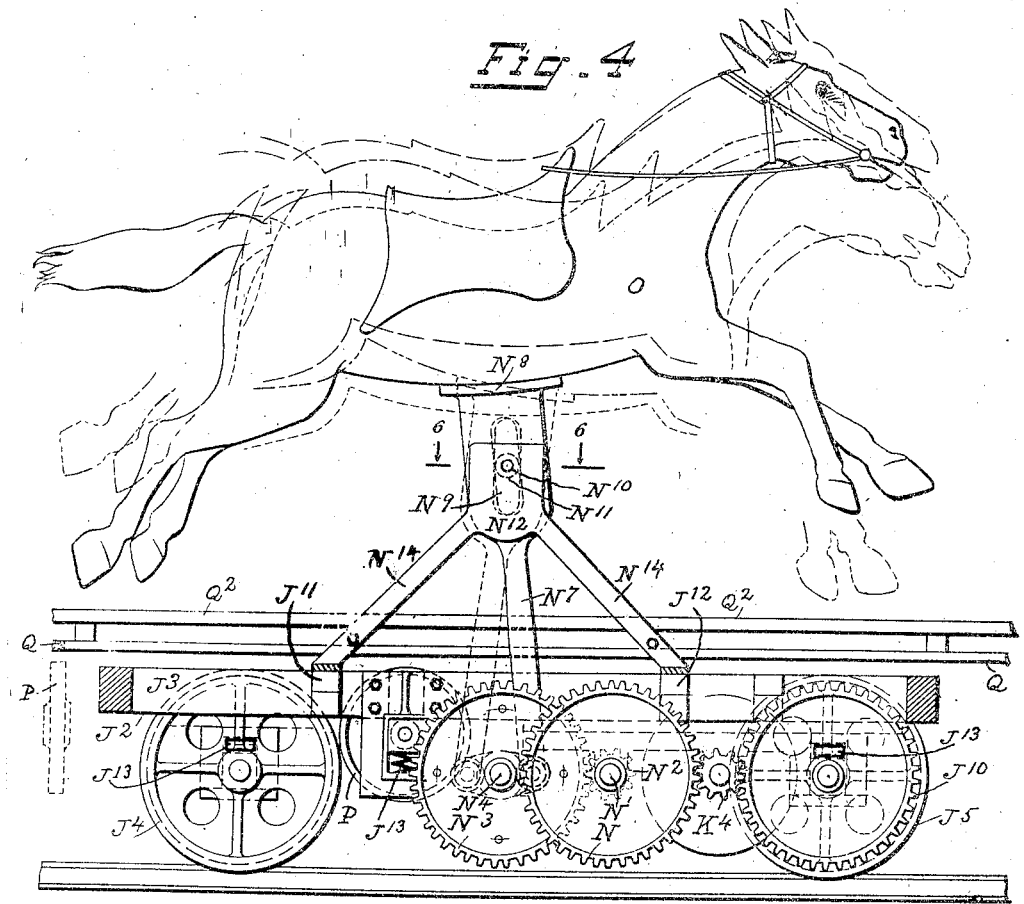
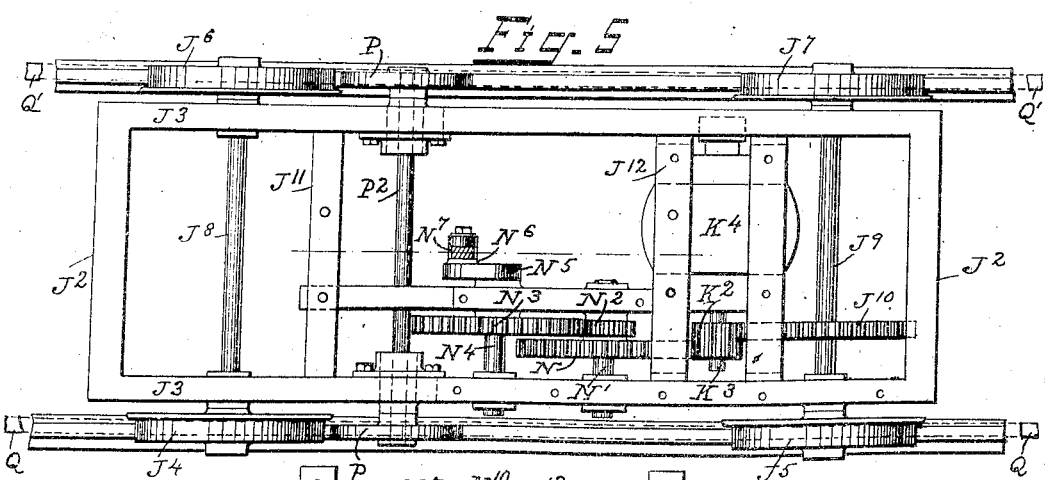
Witnesses
Wm. G. Bergman
F. Harms
Inventor
Thomas F. Gaynor

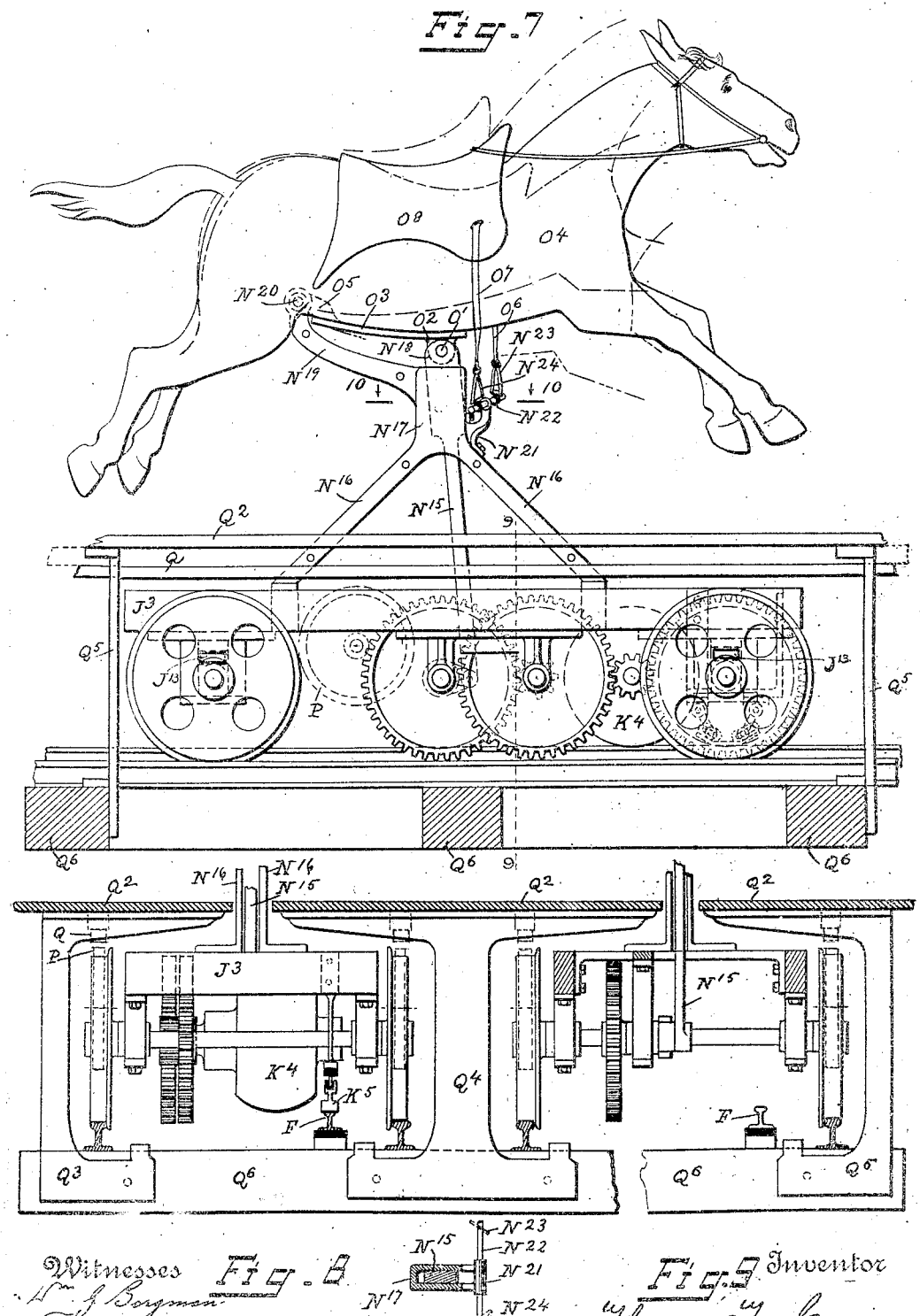

No. 811,284. PATENTED JAN. 30, 1906.
T. F. GAYNOR.
ELECTRIC RACE TRACK.
APPLICATION FILED MAR. 14, 1905.
5 SHEETS—SHEET 5.
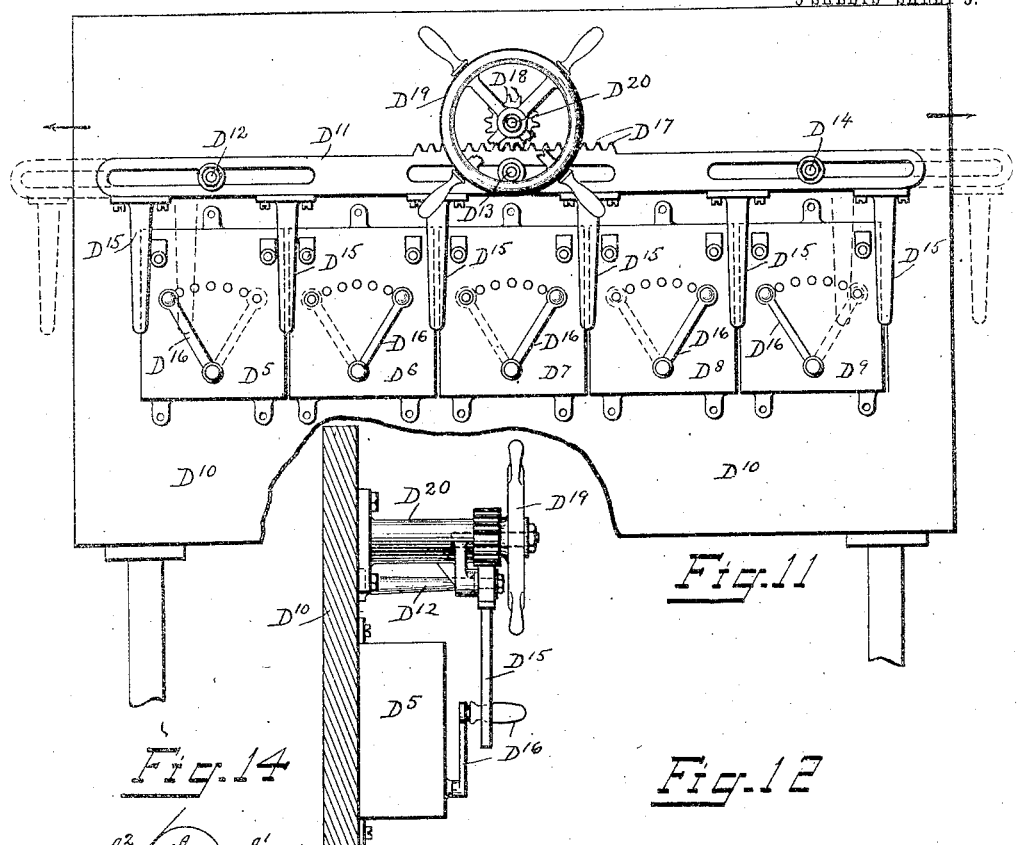
Fig. 11
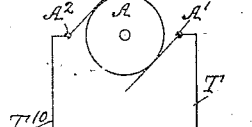
Fig. 12
Fig. 14
Fig. 13
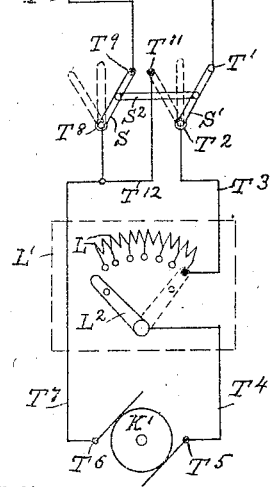
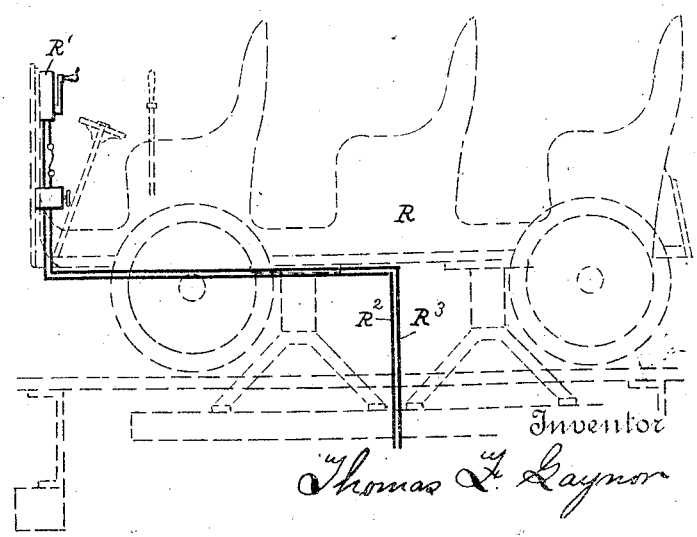
Witnesses
Wm. J. Bergman
F. Harris
Inventor
Thomas F. Gaynor

UNITED STATES PATENT OFFICE.

THOMAS F. GAYNOR, OF NEW YORK, N. Y., ASSIGNOR TO ELECTRIC AMUSEMENT COMPANY, A CORPORATION OF NEW YORK.

ELECTRIC RACE-TRACK.

No. 811,284.     Specification of Letters Patent.     Patented Jan. 30, 1906.

Application filed March 14, 1905. Serial No. 250,043.

*To all whom it may concern:*

Be it known that I, THOMAS F. GAYNOR, a citizen of the United States, and a resident of Brooklyn borough, New York city, in the county of Kings and State of New York, have invented certain new and useful Improvements in Electric Race-Tracks, of which the following is a specification.

This invention relates to electric race-tracks; and it consists in constructing a series of electric railways each having proper conductor connections with a stationary generator, so that trucks carrying ridable figures and propelling-motors may be run upon the tracks and their movements thereon controlled by means of circuit-controllers located at stationary operating-points within visible distance from the tracks by operators in charge of the course and the figures of animal form, as a horse or the like, and being given life-like movements and adapted to be ridden upon by persons and in competition with each other over the course, as though in a race or the like, and which is an object of the invention.

The invention also consists in the special construction and combination of the electric-power system of distribution from the generator to the truck-motors, including the current-controlling mechanisms, the circuit-resistances, the motor-braking appliances, the sectional construction of the contact-conductors and return-conductors, and their respective branch connections hereinafter described.

It also consists in the novel construction of the mechanisms provided to give the figures movements resembling those of the animals represented and in the means employed through which the riders can by the proper exertion of their limbs accelerate the speed of the trucks they are riding upon through suitable connections with their respective truck-motors, and thus enable the riders to compete with each other in winning in a race when so desired. Its nature will be also pointed out more specifically in the claims hereinafter set forth.

The nature and objects of this invention will be more fully understood from the following specification, taken in connection with the accompanying drawings, and in which similar letters refer to similar parts throughout the several views.

Referring to the drawings, Figure 1 is a general plan view of my improved electric race-track. Fig. 2 is a side elevation of Fig. 1. Fig. 3 is a diagrammatic electric plan view of Fig. 1. Fig. 4 is a side elevation of one of the ridable figures with its truck and propelling mechanism. Fig. 5 is a plan view of the truck and propelling mechanism seen in Fig. 4. Fig. 6 is a horizontal section of Fig. 4 on the line 6 6. Fig. 7 is a side elevation of a modified construction of a ridable figure and its truck mechanism. Figs. 8 and 9 are vertical end views of Fig. 7 looking from right to left and through line 9 9, respectively. Fig. 10 is a horizontal section on line 10 10, Fig. 7. Fig. 11 is a front elevation of a set of current-controllers and a master-controller, as shown diagrammatically in Fig. 3 in five places therein. Fig. 12 is a side elevation of Fig. 11. Fig. 13 is a side elevation, in dotted outline, of a car which can be mounted on a truck instead of an animal figure and provided with current-controlling devices. Fig. 14 is a diagram of the electrical connections of a generator, a truck-motor, and the intermediate switch and rheostat devices, partly seen in the left central portion of Fig. 3.

In the drawings, Fig. 1 represents a plan view of an electric race-track made according to my invention and in which a course of four railroad-tracks of an elliptical form is shown. Several groups of riders are shown in different racing positions at different points around on the course, including a group of four riders ready to make a start and four horses which have finished in a race, the latter two groups being at the grand-stand or starting-point, and a plan of which is also shown. The electrical connections between the generator and the operating-points at which the movements of the trucks are controlled around the course is also shown in this figure. Only the top view of the course is visible, however, and which consists of a false floor or platform which is arranged over the track-rails and trucks, but under the figures or vehicles, which are connected to the trucks by suitable standards which move in slits in the platform and which are seen in this figure.

Fig. 2 is a side elevation of Fig. 1 and gives a view of the several groups or riders as seen in Fig. 1 in their respective positions around upon the course.

Fig. 3 is a diagrammatic plan view of the several railroad-tracks comprising the course illustrated in Figs. 1 and 2. This figure shows the track-rails and contact-conductors of the several tracks and five groups of trucks, each of which has a motor and indicated by dotted outlines in their several respective positions upon the tracks. It also shows the power-generator, the feed and return conductors, and the controlling devices through which the current can be supplied to the truck-motors and its control regulated at the operating-points near and within visible distance from the tracks by the persons in charge of the system. This figure also shows variable-resistance mechanisms through which the amount of electricity supplied to the several trucks can be so regulated that the difference in the lengths of the several tracks at their curved portions due to the increased radial dimensions as they extend outwardly from their common center can be so proportioned and compensated with the requisite power that the riders traveling upon the outer tracks can keep abreast of those upon the innermost track and have an equal chance to win a race. These resistance devices are especially adapted for the curved portions of the course, as upon the straight portions the distance to be traveled over by the riders is the same upon all the tracks, and consequently the amount of power supplied to the different trucks in the straight portions of the trucks can be the same. The contact-conductors in this figure are shown as divided into several sections, which are insulated from each other to make the system operative, as will be explained more fully hereinafter. In this figure a motor-braking mechanism is also shown as provided for stopping the movement of a contiguous moving truck after the power has been shut off from the latter by the operator and consisting of a resistance device which is connected up in circuit with the motor after the current-supply has been shut off from the latter, the connections for which will be more fully explained hereinafter. The outer track is also shown as provided with circuit-closers and through which its contact-conductor sections can be connected up, so as to be integral electrically when such an arrangement may be desired, and which arrangement of circuit-closers can of course be applied to any or all of the other tracks. The motor-braking mechanism shown in this figure can likewise be applied to any or all of the sections of a track or tracks, as can also be understood Fig. 4 is a vertical sectional and side elevation view of a truck, its motor mechanism, and gearing arrangement through which the truck is propelled over the track and by which motion is imparted to the animal figure mounted upon the truck by means of the standard shown, and which figure is that of a horse in the act of galloping over a race-course. This figure also shows a view of a portion of the platform and a safety-rail thereunder and against which one of two guard-wheels on the truck is adapted to run in case the truck-wheels should through any cause rise from the track-rails while in motion, thereby preventing the truck from being derailed or the like. This figure also shows a compound motion that is imparted to the horse by a crank and connecting-rod arrangement that by means of which not only do the front and back portions of the horse rise and fall alternately, but also the whole body rises and falls, thus simulating the natural movements of the living animal represented during a galloping movement over a race-track or the like.

Fig. 5 is a plan view of the truck, showing Fig. 4 with its motor mechanism and gearing-trains and guard-wheels.

Fig. 6 is a horizontal section of the connecting-rod and supporting-standards on the line 6 6 in Fig. 4.

Fig. 7 shows a modification in side elevation of the crank and connecting-rod mechanism and supporting-standards for supporting the horse and giving it motion, as illustrated in Figs. 4 and 5, only that but a single up-and-down motion is given to the horse thereby and that the latter is trunnioned upon the standard and the connecting mechanism to make this motion operative. In this figure a bracket is shown connected to the standard and to which the stirrups are attached and which are also suspended to suitable elastic webbing straps, which are suspended by their upper ends from the horse in the usual manner of saddle construction. This stirrup connection with the standard is for the purpose of enabling the rider to support the weight of his body thereon, or vice versa, as the body of the horse rises and falls while the truck is in motion, and so that during the upstroke of the connecting-rod his weight can be partly or entirely removed therefrom, while during the downstroke of the rod his weight can be added to that of a horse, thus through the intermediate gearing adding to the power of the motor, and thereby aiding the latter in accelerating the speed of the device over the track. This figure also shows the platform-supports and their relation with reference to the ties of the railway.

Fig. 8 is a vertical end view of a truck, as seen in Fig. 7, as viewed from right to left, with motor and gear mechanism, the contact-conductor, and current collector or shoe, as indicated by dotted lines in Fig. 7. This figure also shows the front view of two of the platform-supports, the one to the left being that adapted for use at the edge of the platform and the one to the right being one of such as are suitable for supporting one of the portions of the platform between two of the tracks. This figure also shows the relation of the standard and connecting-rod mechanism supporting and operating the horse with reference to the slit in the platform.

Fig. 9 is a vertical and sectional view of Fig. 7 on the line 9 9 of Fig. 7, showing the crank-shaft mechanism through which motion is transmitted to the horse carried by the platform.

Fig. 10 is a horizontal sectional view through the standard and connecting-rod and of the stirrup-supporting device on the line 10 10 in Fig. 7.

Fig. 11 is a front elevation of a group of current-controllers and a master-controller by means of which the movement of the trucks can be controlled, as indicated diagrammatically in Fig. 3. This figure shows five rheostat-controllers of usual construction and as mounted in line with each other upon a suitable support under the projecting fingers of the master-controller, so that any one or all of the rheostats can be operated at will independently of each other regardless of the master-controller, the fingers of which are in non-interfering positions with reference to the rheostats to permit this being done. When it is necessary to move all the rheostats synchronously, so as to start and stop their controlling truck mechanisms simultaneously, however, this result can be attained by the proper manipulation of the rack-and-pinion arrangement of the master-controller, the dotted lines to the left indicating the limit of travel of the master-controller in that direction after the act of cutting off the current by the rheostats, while the dotted lines to the right indicate the limit of movement of the master-controller after throwing the rheostat-handles to the position of full current-supply through these devices.

Fig. 12 is a side elevation of Fig. 11 and of the master-controller and rheostats.

Fig. 13 shows in dotted lines how a vehicle can be mounted upon a truck and provided with a controlling mechanism accessible to the rider therein, as in an automobile or the like, the electrical connections of the controller being shown in full lines and as leading to the motor mechanism of the truck, which is not shown, but being similar to that shown in some of the other figures and as can be understood without illustration.

Fig. 14 represents a diagram of the switch, rheostat, and circuit connections between the power-generator and the truck-motor which is also shown in Fig. 3 in part. This figure shows how the circuit supplying the power from the generator to the motor can be established through the double switch and the rheostat in the usual manner of such connection, how by moving the switch into the vertical (cut-out) position the generator-conductors can be disconnected from the motor, and when the switches are thrown into the oblique (left) position a circuit can be established between the terminals of the motor and through the rheostat when the handle of the latter is brought in contact with the terminal connections of the resistance-coils, thus bringing the latter into circuit with the motor-terminals, and thereby loading the motor electrically, with the resistance thus established whenever the motor is running without connection with the generator, and thus for the time being acting as a generator of current itself. The loading of the motor in this manner is effected by moving the rheostat-handle from the position shown in full lines toward the right and onto the first or the nearest of the resistance-terminals, and in that position the maximum resistance is brought into circuit with the motor and of course the minimum load is put upon it electrically, this being an operation exactly the same as that employed in connecting the motor with the generators as ordinarily employed in starting motors from the stationary condition.

The full nature of this device will be more fully explained hereinafter.

In the drawings, A represents a stationary electric-power generator having the feed-conductors B B' and return-conductors C C', connected with its terminals in the usual manner.

The feed-conductors B B' are connected through the branch connections $B^2$ $B^3$ $B^4$ $B^5$ $B^6$ and corresponding controllers D D' $D^2$ $D^3$ $D^4$ and the intermediate branch connections E, E', $E^2$, $E^3$, $E^4$, $E^5$, $E^6$, $E^7$, $E^8$, $E^9$, $E^{10}$, $E^{11}$, $E^{12}$, $E^{13}$, $E^{14}$, $E^{15}$, $E^{16}$, $E^{17}$, $E^{18}$, $E^{19}$, and $E^{20}$, $E^{21}$, $E^{22}$, and $E^{23}$ with the contact-conductors F' F $F^2$ $F^3$ parallel with and in proximity to the rails G G G' G' $G^2$ $G^2$ $G^3$ $G^3$, comprising the several tracks of the system.

H H' $H^2$ $H^3$ represent variable-resistance devices that are interposed in the respective branch connections between the controller $D^3$ and the corresponding sections $F^4$ $F^5$ $F^6$ $F^7$ of the contact-conductors of the curved portions of the several tracks at the upper end of the course.

I I' $I^2$ $I^3$ represent cut-out switches and through which the contact-conductor sections of the outer-track contact-conductor may be connected together or disconnected, as desired.

J J J J represent the wheeled trucks adapted to run upon the respective tracks, each being provided with an electric motor K, through means of which it is propelled along the track in the usual manner of electric-railway-traction mechanism.

L represents a motor braking and controlling rheostat device through which a braking effect can be produced upon the motor of the truck running in its contiguous section of the track—as, for instance, that of the truck J, with its motor K—and which construction will be more fully understood by referring to Fig. 14, in which all the circuit connections and switch devices between the motor and the generator are fully illustrated and as will be more fully described hereinafter.

Referring to Figs. 4 and 5, a truck $J^2$ is shown of the ordinary construction comprising the frame $J^3$, mounted upon the wheels $J^4$ $J^5$ $J^6$ $J^7$ through their respective axles $J^8$ $J^9$ in the usual manner of such devices. The forward axle $J^9$ of the truck has mounted thereon the gear $J^{10}$, which engages with the pinion $K^2$, mounted upon the shaft $K^3$ of the motor $K^4$ in the usual manner and through which the power of the motor is transmitted to the wheels $J^5$ $J^7$, thereby giving traction motion to the truck. The pinion $K^2$ also engages with a gear N, mounted upon the shaft $N'$, also carrying a pinion $N^2$, which engages a gear $N^3$, mounted upon the crank-shaft $N^4$, to which the crank $N^5$, having the crank-pin $N^6$, is secured and by means of which through a connecting-rod $N^7$ a compound rocking motion is positively and dependently imparted to the horse O, secured thereto by the flange $N^8$ and as indicated by the different positions of the figure shown in full and in dotted lines. The upper part of the connecting-rod $N^7$ is provided with a vertical transverse slit $N^9$, which plays up and down upon a wrist-pin $N^{10}$, having a roller $N^{11}$, and the pin being rigidly secured to the two walls $N^{12}$ $N^{13}$ of a standard $N^{14}$, which is rigidly mounted to the cross-pieces $J^{11}$ $J^{12}$ of the framework of the truck. This arrangement of the upper portion of the connecting-rod $N^7$ between the portions $N^{12}$ $N^{13}$ of the standard serves as a lateral guide for the up and down movements of the connecting-rod and the superimposed horse, giving steadiness of motion to the latter, while maintaining fixity of position like the cross-head and guide arrangement of an engine or the like and as can be understood without further description. The truck is also provided with a pair of guard-wheels P P', mounted upon an axle $P^2$, and which are adapted to run against corresponding overhead rails Q Q', one of which is shown at the left-hand edge of Fig. 4 in section and which are secured to the platform $Q^2$ for this purpose. The guard-wheels P P', however, ordinarily run clear of the guard-rails, as thus indicated; but in case of any accidental uplifting of the truck-wheels from the track, as might occur in case the truck was propelled at an excessive rate of speed while going around a curve or the like, then the guard-wheels will run against the guard-rails, thus preventing a derailment of the truck.

In Fig. 7 the connecting-rod $N^{15}$ has a crank and driving-gear mechanism connected with the motor similar to that described and shown in Figs. 4 and 5, and the standard $N^{16}$, with its upper end $N^{17}$, is of substantially similar construction to that shown in said figure. The upper extremity $N^{18}$ of the connecting-rod $N^{15}$, however, is trunnioned upon a wrist-pin O' in the lug $O^2$, projecting from the support $O^3$, carrying the horse $O^4$, thus making the connecting-rod $N^{15}$ a pitman in operation. The standard $N^{16}$ is provided with a bracket $N^{19}$, having a trunnion-pin $N^{20}$ at its upper extremity and upon which the lug $O^5$ of the support $O^3$, carrying the horse $O^4$, is trunnioned. This arrangement provides means for giving a vertical rocking motion to the horse by the rotation of the motor and upon the pin $N^{20}$, and the limit of the motion being indicated by dotted lines in the figure.

The standard $N^{16}$ has a bracket $N^{21}$ secured thereto, which carries the cross-bar $N^{22}$, to which the stirrups $N^{23}$ $N^{24}$ are connected and the upper ends of which are connected to the elastic straps $O^6$ $O^7$, which are connected to the saddle $O^8$ over the back of the horse $O^4$. This construction enables the rider to place his weight upon the stirrups or upon the saddle alternately and to any degree desired, thereby bringing his weight upon the crank-pin during its downstroke and, vice versa, on the upstroke, so as to aid the motor in accelerating the speed of the truck in this manner. Springs $J^{13}$ $J^{13}$ $J^{13}$ are shown in Figs. 4 and 7 over the journal-boxes to give an elastic riding motion to the horse and the truck; but other spring applications can be added or substituted, as can be understood. The false floor or platform $Q^2$ between the truck and the horse is supported in position by means of uprights $Q^3$ $Q^4$ $Q^5$, secured to the ties $Q^6$ $Q^7$, as can be understood by the description. The platform-sections are arranged so as to cover from view the trucks, making a false flooring, above which only the horses and their supporting-standards are visible, so that an appearance is given to observers as if the horses were running around the course upon the platform, only the feet of the figures being at all times clear of the platform, as can be understood, and to produce which effect, as well as to protect the riders from ever falling upon the trucks or tracks in case of an accident, are the main purposes of the platform.

The contact-conductor is shown in the larger figures as consisting of a rail F, insulated at its base in the usual manner, and the current is collected therefrom by means of a contact collector or shoe $K^5$, having the proper electrical connections with the motor, so as to bring the latter into circuit when desired.

$D^5 D^6 D^7 D^8 D^9$ show a group of current-controllers having resistance-coils and terminal connections of the ordinary construction of such devices. They are mounted in line together upon the support $D^{10}$ and upon which the master-controller $D^{11}$ is also mounted by means of the studs $D^{12} D^{13} D^{14}$, which are secured thereto. Fingers $D^{15} D^{15} D^{15}$ are secured to the master-controller $D^{11}$ and arranged in such position with reference to the controller-handles $D^{16} D^{16}$ as to move the handles in either direction to the full extent of their sweep synchronously whenever this is desired, while permitting of the free and independent manipulation of the handles separately whenever this is to be done. Motion is imparted to the master-controller $D^{11}$ by means of a toothed section $D^{17}$, which engages with the pinion $D^{18}$, having the handwheel $D^{19}$ attached thereto and being mounted upon a stud $D^{20}$, which is secured to the upright $D^{10}$, like the smaller studs $D^{12} D^{13} D^{14}$. The multiple controller is for the purpose of controlling the movement of a group of riders or any one of them, as may be desired, and illustrates the construction of the devices that are shown in Fig. 3 diagrammatically at $D D' D^2 D^3 D^4$.

In Fig. 13 the vehicle device R (shown in dotted lines) illustrates how a number of persons can be carried upon a single truck and how an operator seated therein can be provided with means for controlling the movement of the vehicle while seated therein and which consists of the controller $R'$ and having the proper connections $R^2 R^3$ with the motor with the accessory appliances of an automobile at his command, if such an arrangement is desired.

In Fig. 14, L represents the rheostat portion of a controller $L'$, having the controller-handle $L^2$ of ordinary construction.

S S' represent a pair of circuit-closers connected together by the connection $S^2$ and which serve for connecting up the truck-motor $K'$ through the controller $L'$ with the generator A, and the necessary intermediate conductors being also shown.

The circuit is established from the generator A to the motor $K'$ as follows: from terminal $A'$ through conductor T, terminal $T'$, circuit-closer $S'$, terminal $T^2$, conductor $T^3$, rheostat L, rheostat-handle $L^2$, and conductor $T^4$ to the terminal $T^5$ of the motor $K'$. The return-path of the circuit is, beginning at the terminal $T^6$, the return-conductor $T^7$, the switch-terminal $T^8$, and switch S, the terminal $T^9$, conductor $T^{10}$, and terminal $A^2$ of the generator A. The rheostat-handle $L^2$ in the position shown in full lines of course opens the circuit which is established when it is brought against the nearest terminal of the rheostat L and then as it is advanced gradually to the position shown in dotted lines when the rheostat is short-circuited after the motor $K'$ has attained its full speed. If any intermediate speed of the motor $K'$ is desired, it may be obtained by bringing the handle $L^2$ to the proper rheostat-terminal that will interpose the requisite resistance in the circuit to give the result.

When the switches are moved into the vertical position, as indicated by the dotted lines, the conductor T $T^{10}$ are disconnected from the motor $K'$, and the latter thus losing its power will when running soon come to a stand with its truck; but as emergencies may arise in which the truck should be stopped as quickly as possible this result can be attained by throwing the switches to the extreme left position (indicated by the dotted lines) and which establishes a motor-circuit as follows: from the motor-terminal $T^5$, conductor $T^4$, controller-handle $L^2$, rheostat L, conductor $T^3$, terminal $T^2$, switch $S'$, terminal $T^{11}$, conductor $T^{12}$, conductor $T^7$, to motor-terminal $T^6$. By this arrangement it can be seen that the controller $L'$ may be used in the usual manner of such devices in gradually turning on the current and starting the truck-motor $K'$ and when the latter is to be stopped that the controller also acts in interposing a resistance in the alternative circuit, in which the motor is connected by the proper manipulation of the rheostat-handle $L^2$ and the switches S $S'$, as described, so that whatever counter electromotive force may be generated by the motor while it is running (after its power has been shut off) and until it stops is expended in driving current through the resistance of the rheostat L, which by loading the motor electrically in this way acts as a brake in quickly stopping the motor and through the latter the movement of the truck itself with the rider thereon, this being one of the important novel features of this invention.

It will be observed that the contact-conductors of the whole course are divided transversely into several sections, as indicated by dotted lines U U U U U in Figs. 1 and 3, and that each group of sections of the contact-conductors has corresponding return branch conductors V $V'$ $V^2$ $V^3$ $V^4$, connecting with their respective controllers D $D'$ $D^2$ $D^3$ $D^4$, which are stationed at the operating-points within visible distance from the tracks. These return branch conductors are for the purpose of establishing a temporary braking-circuit with the truck-motors to make the braking operation effective, as described.

The return-conductor C can also be connected with the track-rails in the usual manner of electric-railway construction and as indicated at $C^2 C^2$ near the generator A in Fig.

3. The contact-conductor sections of each track may of course be connected together, so as to make them integral electrically, by means of the cut-out switches I I' I² I³, as shown, connecting the sections of the contact-conductor of the outer track in Fig. 3, as already described.

Ordinarily the short sections of the contact-conductors of the several tracks immediately behind the home starting-station W and controlled by the controller D are left cut out of circuit and dead electrically, so that the motors of the trucks when the latter reach these sections on the home stretch of a race thus lose their propelling power and the trucks come to a stand before reaching the starting-point, so as to enable the riders to dismount at the grand stand or starting-station W. The trucks can then be moved forward by the attendant in charge, so as to come upon the contiguous starting portion of the course, the tracks of which are controlled by the controller D' electrically, and when the new riders are mounted upon their respective horses in proper starting-line with each other, as indicated in Figs. 1 and 2, within the grand stand the power can be synchronously applied to all of the respective trucks by the proper manipulation of the controller D', and thereby giving an equal start to the whole group of riders. When the riders thus started off reach the next section of the course, their movements thereupon are controlled by the operator at the central operating-station X within the course and in visible distance therefrom and who also can control them around upon the course as they reach each of the other sections thereof successively until the home or stopping section is finally reached and the race thus finished. By this arrangement it can be seen that the movement of the trucks around the course can be completely controlled and regulated by the operators in charge of the controllers at the stationary operating-points and as effectively as could be done if each of the riders had individual means of controlling the power at hand while riding upon his mount, and the operators have full control of all the riders upon the whole course at the same time, which is a great advantage.

The difference in the lengths of the curved portions of the tracks can be compensated so that each rider can have sufficient power supplied to his respective motor to enable him to keep abreast of his competitors in the race by means of the manipulation of the controllers D² D³ D⁴ by the operator in charge thereof or else through the interposition of the variable resistances H H' H² H³, as already described. Moreover, the operator can increase or retard the speed of any of the riders at will through the said means at any time, if so desired.

Fuses $E^{24}$ $E^{25}$ $E^{25}$ $E^{25}$ can be inserted in the feed branch wires of the system, as indicated in the branches $E^{20}$ $E^{21}$ $E^{22}$ $E^{23}$, as a precaution against accidental short-circuiting of the system. (See Fig. 3.)

The truck-driving axle and the crank-shaft figure-actuating mechanism by being both geared to the motor-shaft provides a positive and direct interdependence of elements having advantages not possessed by devices of this class in which the crank mechanism is connected to one axle of the truck and the motor mechanism to the other axle and the two elements thus being independent of each other—that is, where the crank is independent of the primary moving mechanism. In such devices it has been found that the oscillatory vertical movements of the figure and the rider thereon have so affected the end of the truck to which the crank was connected as to cause the corresponding wheels to rise from the track and a liability of derailing the truck and injury to the rider as a consequence.

In this invention it will be noticed that the crank mechanism and the standard supporting the figure are arranged in the middle of the truck and the weight of the figure (and that of a rider, if properly mounted thereon) is thus better distributed upon all the truck-wheels than can be done upon said devices. Moreover, the power is directly and positively transmitted from the motor to the figure, and vice versa and interdependently, while in the devices referred to the power transmission is only through the axles and wheels and the tractional friction of the latter upon the track-rails, with a consequent liability of slippage thereon, and the motor and crank mechanism are mechanically independent of each other, which arrangement is objectionable.

From the foregoing description of the system the nature and the operation of this invention can be understood without further explanation. This invention can be constructed in the usual manner of electric-railway construction and of materials ordinarily thus employed. A race-course can be constructed of any shape or dimensions and of any number of tracks desired and containing all or only part of the mechanisms and combinations of elements herein described and illustrated. Figures and vehicles of any suitable design can be mounted upon the trucks and proper movements imparted thereto and made to travel around over the course in substantially the manner described, thus giving a great range of applicability to this invention.

It can thus be seen that I provide a simple and complete system and apparatus for the purposes intended and meeting all the requirements of such an invention.

Having thus described my invention, what I claim, and desire to secure by Letters Patent, is—

1. In an electric race-track, the combination of a generator a feed-conductor, a contact-conductor, a return-conductor, a railway-track, a railway-truck carrying a propelling-motor in circuit with the generator, a ridable figure mounted thereon—and a crank mechanism through which power is directly transmittible from the motor to the figure and vice versa, substantially as described.

2. In an electric race-track, the combination of the railway-track, a railway-truck carrying a propelling-motor—a ridable moving figure mounted thereon—and a power-transmitting mechanism connecting the motor with the figure and through which movement is directly transmittible from the motor to the figure and vice versa, substantially as described.

3. The ridable race-track device consisting of, a truck with its track-wheels, a propelling-motor, a ridable figure, a standard mounted upon the truck and supporting the figure, and a power-transmitting crank mechanism connecting the motor with the figure and all being combined substantially as described.

4. In a ridable race-track device, the combination of a ridable figure, a connecting-rod supporting the figure, a crank mechanism connected to the connecting-rod and to a power-transmitting mechanism, a connecting-rod-guiding standard, and a truck supporting the standard and carrying all of the elements of the combination, substantially as described.

5. In a ridable race-track device, the combination of a ridable figure, a crank power mechanism, a guiding-standard, and a connecting-rod supporting the figure at one end and connected at its other end to a crank power mechanism and having a wrist-pin connection with the standard through which a vertical and rocking motion may be given to the figure by the crank mechanism, substantially as described.

6. In a ridable race-track device, the combination of a ridable figure, a supporting-standard having a bracket to which the figure is trunnioned, a pitman connecting-rod connected at one end to the figure and by its other end to a crank-power-transmitting mechanism, a truck-propelling motor connected with the crank mechanism and a truck carrying all of the said elements, substantially as described.

7. In a ridable race-track device, the combination of a wheeled truck, a propelling-motor, a crank mechanism connected to the motor, a connecting-rod connected to the crank mechanism, a moving ridable figure connected to the connecting-rod, a standard mounted upon the truck and supporting the figure through a trunnioned connection therewith and having a pedal extension upon which a rider while upon the figure may support his weight and accelerate the speed of the truck, as desired, substantially as described.

8. In an electric race-course, the combination of a generator, a feed-conductor, a return-conductor, a series of railway-tracks, a corresponding series of trucks thereon, each carrying a ridable figure and provided with a propelling-motor, a corresponding series of contact-conductors each of which is divided into insulated sections and a circuit-controller for each contact-conductor section and connecting it with the feed-conductor and located at an operating-point within visible distance of the course, substantially as described.

9. In an electric race-course, the combination of a generator, a feed-conductor, a return-conductor, a series of railway-tracks, a contact-conductor for each track and a combined individual and master circuit-controller connecting each and all of the contact-conductors with the feed-conductor and located within visible operating distance from the course and a truck for each track and carrying a propelling-motor, substantially as described.

10. In an electric race-course, the combination of a generator, a feed-conductor, a return-conductor, a series of railway-tracks, a truck upon each track and carrying a ridable device and a propelling-motor, a contact-conductor for each track and a combined individual and master circuit-controller connecting each and all of the contact-conductors with the feed-conductor and located within visible operating distance from the course and by means of which the movements of the several trucks can be controlled while around upon the course, substantially as described.

11. In an electric race-track, the combination of a generator, a feed-conductor, a return-conductor, a truck carrying a ridable figure and provided with a propelling-motor, a controller having a rheostat mechanism, a double switch one member of which is adapted to open and close the return-conductor between the generator and the motor and the other member adapted to open and close the feed-conductor through the controller and alternately establish a circuit through the motor and the rheostat of the controller whenever the generator is thereby disconnected from the motor and the controller, substantially as described.

12. In an electric race-course, the combination of a generator, a feed-conductor, a return-conductor, a series of parallel railway-tracks, a contact-conductor for each track divided into insulated sections and the contiguous sections of the contact-conductors of two or more of the tracks being each provided with a corresponding variable-resistance device and a controller mechanism which are located at a fixed position with reference to the tracks, a truck carrying a ridable figure and provided with a propelling-motor in circuit with the generator for each track, and the resistance devices adapted to regulate the amount of electricity supplied to their respective contact-conductors so that the trucks will be made to run around upon all of the tracks in the same amount of time and to thereby compensate for their differences of length, substantially as described.

Signed at New York city, in the county of New York and State of New York, this 11th day of March, A. D. 1905.

THOMAS F. GAYNOR.

Witnesses:
MOLLIE ROSENBLATT,
EMMA M. FIELD.